(12) United States Patent
Amidi

(10) Patent No.: US 7,768,394 B2
(45) Date of Patent: Aug. 3, 2010

(54) SYSTEM AND APPARATUS FOR INTEGRATED LOCATION DETECTION AND WIRELESS COMMUNICATIONS

(75) Inventor: Soroush Amidi, Montreal (CA)

(73) Assignee: Honeywell International Inc., Morristown, NJ (US)

( * ) Notice: Subject to any disclaimer, the term of this patent is extended or adjusted under 35 U.S.C. 154(b) by 348 days.

(21) Appl. No.: 11/824,755

(22) Filed: Jul. 2, 2007

(65) Prior Publication Data

US 2009/0009327 A1    Jan. 8, 2009

(51) Int. Cl.
*G08B 1/08* (2006.01)
(52) U.S. Cl. .............. 340/539.16; 340/573.1; 340/539.13; 340/825.36; 340/825.49
(58) Field of Classification Search .......... 340/573.1, 340/539.13, 825.36, 825.49
See application file for complete search history.

(56) References Cited

U.S. PATENT DOCUMENTS

| | | | |
|---|---|---|---|
| 6,034,603 A | 3/2000 | Steeves | |
| 6,570,487 B1 | 5/2003 | Steeves | |
| 7,005,985 B1 | 2/2006 | Steeves | |
| 7,038,590 B2 * | 5/2006 | Hoffman et al. | 340/573.1 |
| 7,286,158 B1 | 10/2007 | Griebenow | |
| 2001/0030625 A1 | 10/2001 | Doles et al. | |
| 2004/0229560 A1 | 11/2004 | Maloney | |
| 2005/0258955 A1 | 11/2005 | Gloekler et al. | |
| 2005/0258956 A1 | 11/2005 | Neuwirth | |
| 2006/0026316 A1 | 2/2006 | Milenkovic | |
| 2007/0103303 A1 | 5/2007 | Shoarinejad | |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |
| 2007/0205886 A1 | 9/2007 | Huseth et al. | |
| 2007/0241901 A1 | 10/2007 | Cage et al. | |
| 2007/0241965 A1 | 10/2007 | Kolavennu et al. | |
| 2007/0268884 A1 | 11/2007 | Kolavennu et al. | |
| 2008/0109098 A1 | 5/2008 | Moshier et al. | |
| 2008/0109099 A1 | 5/2008 | Moshier | |
| 2008/0122641 A1 | 5/2008 | Amidi | |
| 2008/0123934 A1 | 5/2008 | Amidi | |

FOREIGN PATENT DOCUMENTS

| | | |
|---|---|---|
| WO | WO2005/062066 A2 | 7/2005 |
| WO | WO2007/017871 A2 | 2/2007 |

OTHER PUBLICATIONS

"IntelaTrac PKS Redefines Field Data Collection and Management," Honeywell, Feb. 2006, 2 pages.

(Continued)

*Primary Examiner*—Daryl Pope
(74) *Attorney, Agent, or Firm*—Munck Carter, LLP

(57) ABSTRACT

An apparatus, system and method are provided for an integrated location detection and wireless communication tracking node. The tracking node includes a housing, a wireless node located in the housing, and a tracking receiver located in the housing. The tracking receiver is coupled to the wireless node and the wireless node is operable to transmit a location signal received by the tracking receiver from a tracking device. The wireless node may include a wireless relay node that is operable to relay a radio frequency signal from a leaf node to one of a gateway and an intermediate node.

21 Claims, 3 Drawing Sheets

OTHER PUBLICATIONS

"Powerful Calibration Management with DocuMint," Honeywell, Feb. 2008, 4 pages.
"Lumidor Minimax XT," Honeywell, Dec. 2005, 4 pages.
"PanOS Platform, Unified Location Management Platform," PanGo, 2007, 2 pages.
"Ekahau T301-A Wi-Fi Tag," ekahau, 2007, 2 pages.
"n-sight: The Mobile Video Collaboration System (MVCS)", LibreStream, 2007, 5 pages.

* cited by examiner

SYSTEM AND APPARATUS FOR INTEGRATED LOCATION DETECTION AND WIRELESS COMMUNICATIONS

TECHNICAL FIELD

This disclosure relates generally to communication systems and more specifically to a system and apparatus for tracking and wireless communication node.

BACKGROUND

In many process control applications the cost of running wires from nodes such as sensors, actuators and user interfaces to the process control system limits the number and location of such nodes initially deployed. Cost and difficulty of wiring installation may also limit the deployment of additional nodes in an already-functioning plant. The recent development of wireless communication technologies—such as Bluetooth, IEEE® 802.11, RFID and others—promise a solution to such wiring costs, but not without introducing new challenges to the reliability and security of a process control system.

Processing facilities are often managed using process control systems. Example processing facilities include manufacturing plants, chemical plants, crude oil refineries, ore processing plants, and coal or other types of mines. Among other operations, process control systems typically manage the use of valves, pumps, and other industrial equipment in the processing facilities.

People and asset tracking systems often provide the ability to track the locations of various people and assets in a particular environment. These systems are routinely used as part of security systems, allowing the security systems to identify when people enter restricted areas or when assets are moved from their designated locations. In an industrial facility, such systems are used to improve safety, security and operational efficiency. As a security system, an asset tracking systems can send a notification when an unauthorized individual, wearing a tracking badge, enters a restricted area. As a safety system, an asset tracking system can locate personal when incidents occur or can integrate the location of assets during a dangerous procedure. Furthermore, as an operational improvement system, an asset tracking system can locate an asset or provide statistical data regarding asset utilization. However, continuous precise real-time people and asset tracking systems were typically not feasible for covering large indoor or outdoor areas, such as large industrial or other processing facilities. The development of Ultra Wide Band (UWB) Radio Frequency Identification (RFID) tracking technology and other technology has made it possible to track people and assets in very large facilities.

SUMMARY

This disclosure provides a system and apparatus for integrated location detection and communications relay.

In a first embodiment, an apparatus includes a housing, a wireless node located in the housing, and a tracking receiver located in the housing. The tracking receiver is coupled to the wireless node and the wireless node is operable to transmit a location signal received by the tracking receiver. In particular embodiments, the wireless node comprises a wireless relay node operable to relay a radio frequency signal from a leaf node to one of a gateway and an intermediate node.

In a second embodiment, a system includes a tracking device and a tracking node. The tracking node includes a housing, a wireless node located in the housing, and a tracking receiver located in the housing. The tracking receiver is coupled to the wireless node and the wireless node is operable to transmit a location signal received by the tracking receiver from the tracking device.

In particular embodiments, the system further includes a location server. The tracking node is operable to transmit the location signal to the location server and the location server is operable to determine a location of the tracking device In a third embodiment, a method includes providing a wireless node located in a housing. The method further includes providing a tracking receiver located in the housing and coupling the tracking receiver to the wireless node. The wireless node is operable to transmit a location signal received by the tracking receiver.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
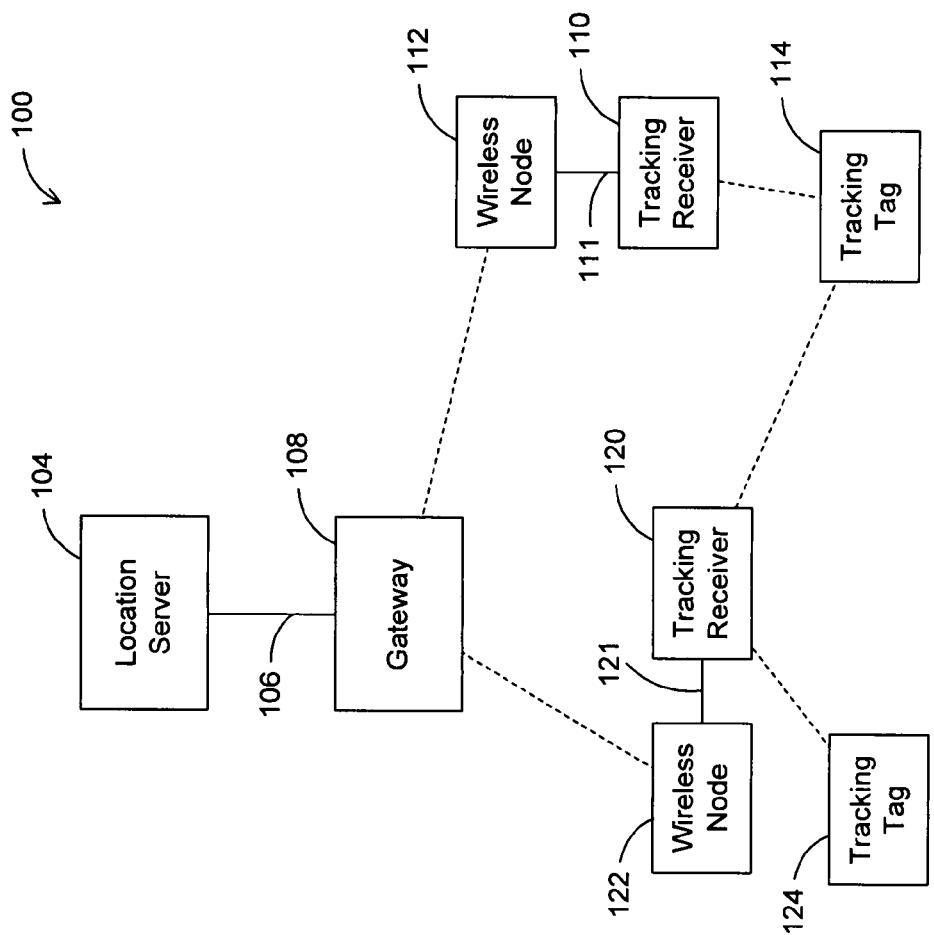
FIG. 1 illustrates a system for providing wireless reporting of location information.

FIG. 1 illustrates a system 100 for providing wireless reporting of location information. A location server 104 may be coupled by a communication link 106 to a wireless gateway 108 that provides wireless communication to process control system elements.

Asset tracking (or location detection) systems are typically wired systems—that is, tracking receivers are typically coupled by wired connections to a location server that consolidates information from numerous receivers to produce location information for people or assets being tracked. In order to use a location detection system in an industrial plant, location detection receivers may be wired to existing or specially installed wireless transmitters.

When location detection functionality is to be added to the system 100, a location detection receiver 110 (also known as a tracking receiver) may be installed in the area to be monitored and coupled by a wired communication link 111 to a wireless node 112. In this way, signals received from a location detection tag 114 (also known as a tracking tag) by the tracking receiver 110 may be wirelessly communicated to the gateway 108 and then to the location server 104 via communication link 106. Wireless communication paths are indicated in FIG. 2 by dashed lines.

Where location detection is to be added in another area, a second tracking receiver 120 may be installed and coupled by a wired communication link 121 to a wireless node 122. In this way, the location detection receiver 120 may receive signals from a location detection tag 124 and send the signals to the wireless node 122 for transmission to the location server 104. Where improved accuracy is required in the area monitored by location detection receiver 110, the tracking receiver 120 may be installed to receive signals from the tracking tag 114. Receipt of such signals by the location detection from both tracking receivers 110 and 120 may allow the location server 104 to produce a more accurate estimate of the location of the tracking tag 114.

In the system 100, the wireless nodes 112 and 122 may be manufactured by a first manufacturer and installed by a first sub-contractor, while the tracking receivers 110 and 120 may be manufactured by a second manufacturer and installed by a second sub-contractor. When problems arise with a tracking receiver/wireless node pair, technicians may have trouble determining whether the failure is in the tracking receiver, the communication link or the wireless node.

Figure 2:
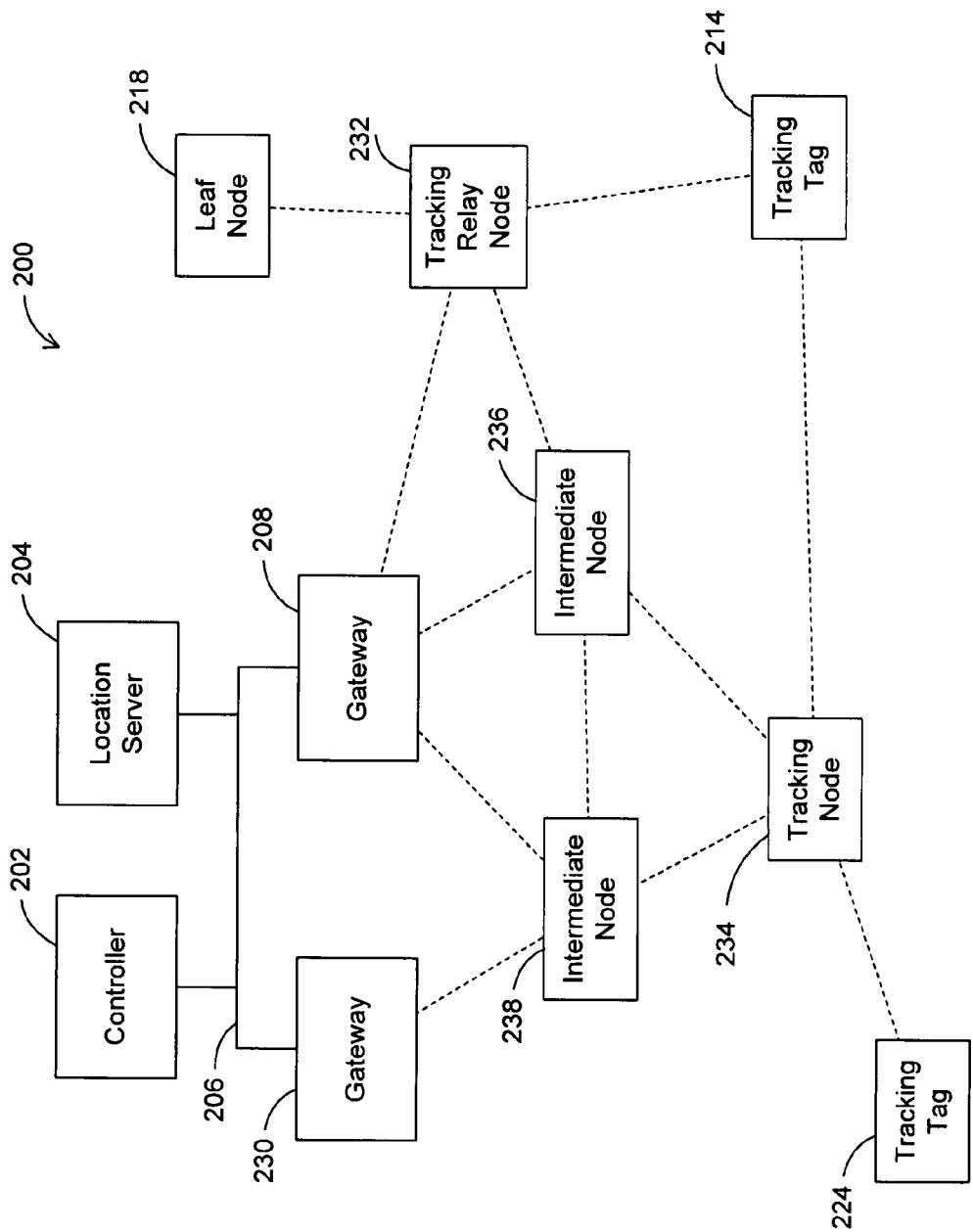
FIG. 2 illustrates a system according to the present disclosure for providing wireless reporting of location information.

FIG. 2 illustrates a system 200 according to the present disclosure for providing wireless reporting of location information. The embodiment of the system 200 shown in FIG. 2 is for illustration only. Other embodiments of the system 200 could be used without departing from the scope of this disclosure.

In this example, the system 200 includes a controller 202 and a location server 204 communicating via a network 206. The network 206 may be Ethernet, Fault Tolerant Ethernet, or other suitable network. The system 200 also includes gateway nodes 208 and 230, which communicate via network 206 with each other and with the controller 202 and the location server 204. Gateway nodes may also communicate wirelessly with each other. Wireless communication paths are indicated in FIG. 1 by dashed lines. Wireless communication in the system 200 may be performed using the WiFi protocol, the ZigBee protocol, other wireless communication protocol, or using a combination of protocols. Intermediate node 238 is able to communicate wirelessly with both the gateway nodes 208 and 230, while the intermediate node is able to communicate wirelessly with only the gateway 208. Intermediate nodes 236 and 238 are also able to communicate wirelessly with each other.

A tracking node 234 is able to receive a location signal from a tracking tag 224 and wirelessly send a corresponding signal via the intermediate nodes 236 and 238 to the location server 204. In this way, location signals received from the tracking tag 224 may be sent by a plurality of communication pathways to the location server 204. Use of a plurality of communication pathways provides greater reliability for wireless communications in the system 200.

A tracking relay node 232 is able to receive a location signal from a tracking tag 214 and wirelessly send a corresponding signal via the intermediate node 236 and the gateway 208 to the location server 204. The tracking relay node is further able to provide wireless relay communications between a leaf node 218 and process control system elements such as the controller 202. Where the leaf node 218 is a sensor, it may send readings of a monitored process variable to the controller 202 via the tracking relay node 232. Where the leaf node 218 is an actuator, it may receive commands from the controller 202 via the tracking relay node 232. Either type of leaf node may send diagnostic information or receive configuration commands to the controller 202. The location of the leaf node 218 may permit it to communicate wirelessly directly with the intermediate node 236 or the gateway 208 in order to send and receive signals to the controller 202.

While system 200 describes the use of tracking tags, it will be understood that location signals may also be sent to the tracking nodes 232 and 234 from other tracking devices. Examples of such devices are mobile computers, handheld devices such as personal digital assistants (PDAs), and cell-phones.

The tracking tags 214 and 224 may be used to determine the location of personnel or physical assets. As the location server 204 determines a location for a tracking tag, it may communicate the location to the controller 202. The controller 202 may compare the location information to map data or other stored data to determine whether an alarm condition should be raised due to movement of the tag into or out of a geographical area of concern. The controller 202 may further cause changes in a process under control—for example by shutting down machinery or emptying material storage containers—in response to the movement of a person into a zone of danger or the removal of an asset from its proper location.

Although FIG. 2 illustrates one example of a system for providing wireless reporting of location information, various changes may be made to FIG. 2. For example, the layout and arrangement of the system could vary, and any number of tracking devices, leaf nodes, tracking nodes, tracking relay nodes, intermediate nodes, gateways, networks, servers, and controllers could be used or supported. Also, components could be combined or omitted and additional components could be added in the system 200 according to particular needs. Furthermore, while the wireless communication of system 200 is described as radio frequency communication, it will be understood that other types of wireless communication, such as infrared, may be used. In addition, while described as being used to providing wireless reporting of location information in an industrial facility, the system 200 could be used to provide wireless reporting of location information in any other type of environment.

Figure 3:
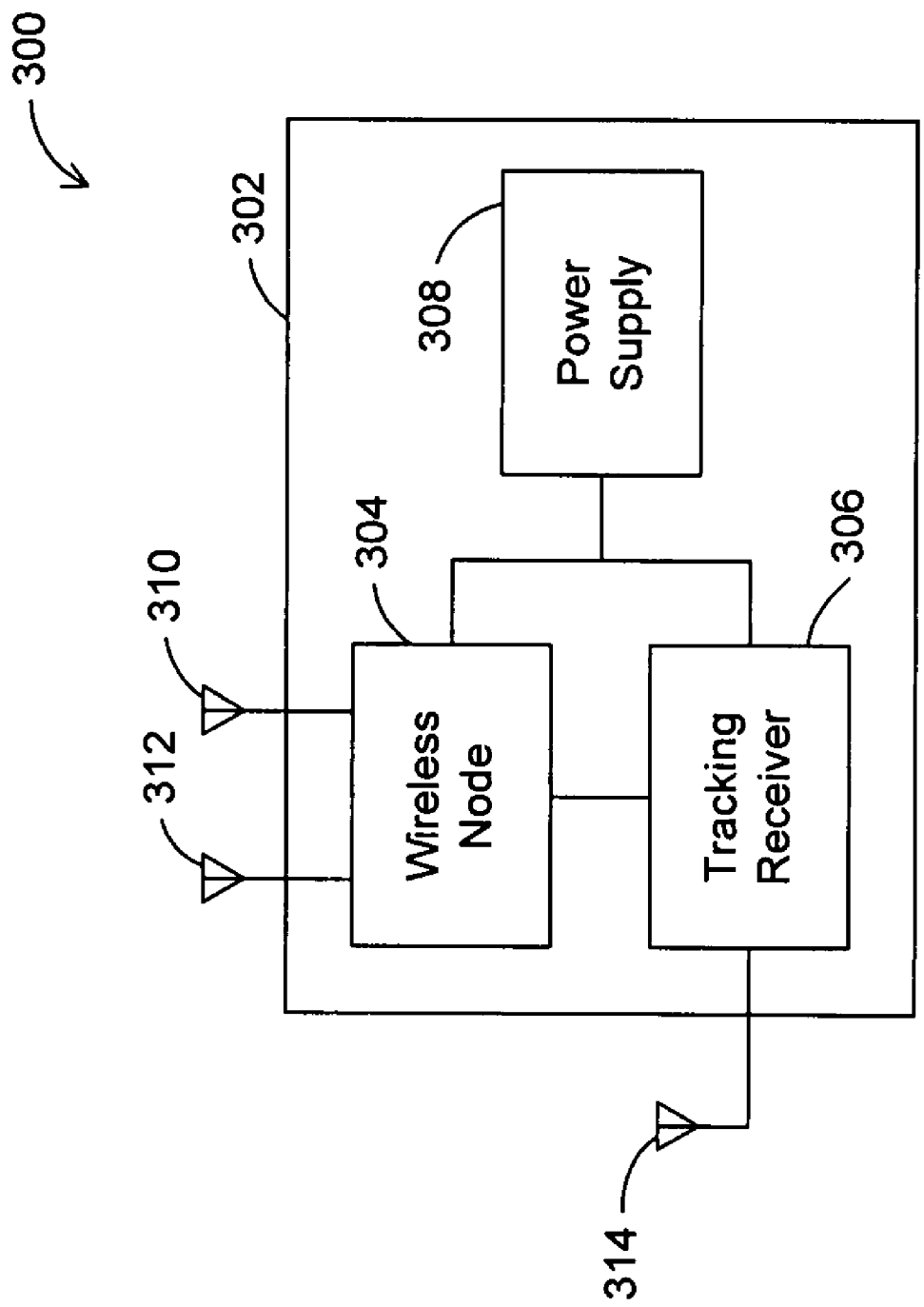
FIG. 3 illustrates a tracking relay node according to the present disclosure.

FIG. 3 illustrates a tracking relay node 300 according to the present disclosure. The embodiment of the device 300 shown in FIG. 3 is for illustration only. Other embodiments of the node 300 could be used without departing from the scope of this disclosure. Also, for ease of explanation, the node 300 is described with respect to the system 200 of FIG. 2. The node 300 could be used in any suitable system.

The tracking relay node 300 includes a housing 302. Located in the housing 302 are a wireless node 304 and a tracking receiver 306 communicatively coupled to the wireless node. A power supply 308 may be included in the housing 302 to provide electrical power to the wireless node 304 and the tracking receiver 306. In other embodiments of the disclosure, the power supply 308 may be located outside the housing 302. In still other embodiments, separate power supplies may be provided for the wireless node 304 and the tracking receiver 306. In yet other embodiments, a battery power supply in the housing 302 may be backed up by a second power supply outside the housing 302, such as a solar power supply or other scavenged power supply.

The tracking receiver 306 may be an Ultra Wide Band receiver. The tracking receiver 306 is coupled to an antenna 314 for receiving location signals from the tracking tag 214 or the tracking tag 224. The antenna 314 may be a directional antenna, an antenna array, or an omni-directional antenna. Where the antenna 314 is an antenna array, the tracking receiver 306 may process the received location signal before forwarding one or more signals related to the tracking tag or the received signal to the location server 204 via the wireless node 304.

The wireless node 304 is a relay node, which may be coupled to antennas 310 and 312. Signals received from the leaf node 218 via the antenna 310 and retransmitted to the gateway 208, the intermediate node 236, or other relay node via antenna 312. Location signals received by the tracking receiver 306 may also be transmitted via the antenna 312.

In other embodiments, the wireless node 304 may be coupled to only the antenna 312 and use that antenna for receiving signals from the leaf node 218, as well as for transmitting signals. In still other embodiments, the wireless node 304 may be a transmit-only node, coupled only to the antenna 312. In such an embodiment, the wireless node 304 operates only to transmit location signals received by the tracking receiver 306.

Although FIG. 3 illustrates one example of an integrated tracking receiver and wireless relay node, various changes may be made to FIG. 3. For example, the layout and arrangement of the node 300 could vary, and any number of tracking receivers, wireless nodes, numbers and types of antennas could be used or supported. Also, components could be combined or omitted and additional components could be added in the node 300 according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus housing that comprises a wireless node coupled to a tracking receiver, the apparatus operable to, transmit a location signal received by the tracking receiver, wherein the apparatus is also operable to determine a location of an origin of the location signal using a location server, and, in response thereto, the operation of at least one device is adjusted using at least one controller based upon the location of the origin of the location signal.

2. The apparatus of claim 1, further comprising a power supply operable to supply electrical power to the wireless node and the tracking receiver.

3. The apparatus of claim 1, wherein the wireless node is operable to transmit the location signal to the location server.

4. The apparatus of claim 3, wherein the wireless node is operable to transmit the location signal to the location server via a plurality of intermediate nodes.

5. The apparatus of claim 1, wherein the tracking receiver comprises one of a directional antenna, an array antenna, and an omni-directional antenna.

6. The apparatus of claim 1, wherein the tracking receiver comprises an Ultra Wide Band receiver.

7. The apparatus of claim 1, wherein the wireless node is operable to communicate using one of the WiFi protocol and the ZigBee protocol.

8. The apparatus of claim 1, wherein the wireless node comprises a wireless relay node operable to relay a radio frequency signal from a leaf node to one of a gateway and an intermediate node.

9. A system, comprising:
   a tracking device; and
   a tracking node, comprising:
      a housing;
      a wireless node located in the housing; and
      a tracking receiver located in the housing and coupled to the wireless node,
   wherein the tracking node is operable to receive from the tracking device a location signal using the tracking receiver and to transmit the location signal using the wireless node, wherein the system is operable to determine the location of the tracking device using a location server, and wherein the system is further operable to cause an adjustment to an operation of at least one device using at least one controller based upon the location of the tracking device.

10. The system of claim 9, wherein the tracking node further comprises a power supply operable to supply electrical power to the wireless node and the tracking receiver.

11. The system of claim 9, further comprising the location server, wherein:
   the tracking node is operable to transmit the location signal to the location server; and
   the location server is operable to determine the location of the tracking device.

12. The system of claim 11, further comprising a plurality of intermediate nodes, wherein the tracking node is operable to transmit the location signal to the location server via the plurality of nodes.

13. The system of claim 9, wherein the tracking receiver comprises one of a directional antenna, an array antenna, and an omni-directional antenna.

14. The system of claim 9, wherein the tracking receiver comprises an Ultra Wide Band receiver.

15. The system of claim 9, wherein the radio frequency relay node is operable to communicate using one of the WiFi protocol and the ZigBee protocol.

16. The system of claim 9, further comprising a leaf node and one of a gateway and an intermediate node, wherein the wireless node comprises a wireless relay node operable to relay a radio frequency signal from the leaf node to the one of the gateway and the intermediate node.

17. A method, comprising:
  receiving a location signal at a wireless device, the wireless device comprising a wireless node located in a housing and a tracking receiver located in the housing and coupled to the wireless node, wherein the wireless node is operable to transmit the location signal received by the tracking receiver;
  determining an origin of the location signal; and
  adjusting at least one device based upon the origin of the location signal.

18. The method of claim 17, wherein the wireless node transmits the location signal to a location server.

19. The method of claim 18, wherein the wireless node transmits the location signal to the location server via a plurality of intermediate nodes.

20. The method of claim 17, further comprising providing one of a directional antenna, an array antenna, and an omni-directional antenna coupled to the tracking receiver.

21. The method of claim 17, wherein the wireless node relays a radio frequency signal from a leaf node to one of a gateway and an intermediate node.

* * * * *